No. 722,947. PATENTED MAR. 17, 1903.
H. COTTRELL.
ELECTRODE FOR REVERSIBLE GALVANIC BATTERIES.
APPLICATION FILED SEPT. 13, 1902.
NO MODEL.
Fig. 1.
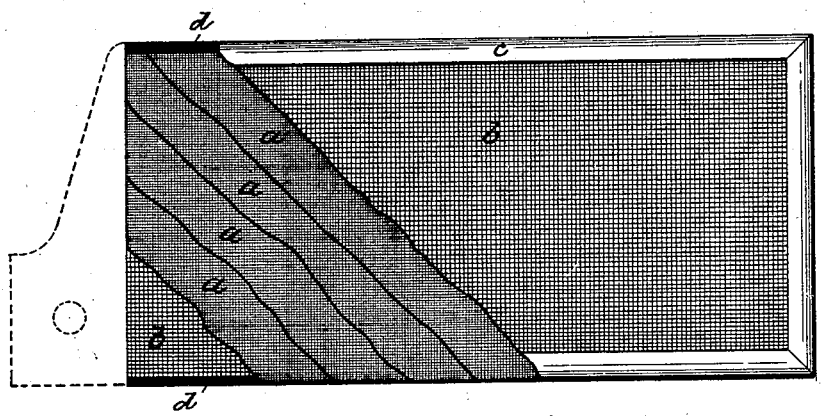
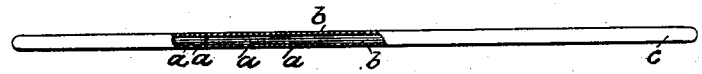
Fig. 2.
WITNESSES:
Howard C. Condit
Howard H. Eckert
Herbert Cottrill
INVENTOR

UNITED STATES PATENT OFFICE.

HERBERT COTTRELL, OF NEWARK, NEW JERSEY.

ELECTRODE FOR REVERSIBLE GALVANIC BATTERIES.

SPECIFICATION forming part of Letters Patent No. 722,947, dated March 17, 1903.

Application filed September 13, 1902. Serial No. 123,209. (No model.)

*To all whom it may concern:*

Be it known that I, HERBERT COTTRELL, of the city of Newark, county of Essex, State of New Jersey, have invented certain new and useful Improvements in Electrodes for Reversible Galvanic Batteries, of which the following is a specification.

The object of my invention is to provide electrodes formed of material practically indestructible in the use to which they are designed and which at the same time have the important feature of being of very light weight and of high capacity both as to voltage and amperage.

My invention consists in forming electrodes made as a whole or in part of carbonized cellulose, in which said carbonized material comprises both the absorbent of the materials to be rendered active in the battery and the casing thereof in the manner hereinafter described. To do this, I avail myself of the well-known property of carbonized cellulose to absorb gases as well as of its structural advantage for electric conductivity.

Preferably I form plates of carbonized cotton textile fabric, arranging them in several layers in conductive contact with each other. Such an assemblage of plates may be made of a comparatively finely woven cotton fabric and should be carbonized to a soft degree only. They may be permeated with a metallic salt or salts in solution—as, for instance, a solution of lead—and they may be coated with a material to be rendered active in the battery—as, for instance, lead or oxid of lead. I inclose said assembled plates between exterior plates made, preferably, of coarser cotton fabric of a more open weave and carbonized to a higher degree and usually "treated" with liquid hydrocarbon and again carbonized, so as to give them a greater strength and rigidity. The whole group may then be subjected to sufficient pressure to insure uniformity of thickness, and the edges may be joined by a suitable electrically-conductive cement, so as to form a homogeneous plate. A metallic binding, framing, or riveting may be used to properly electrically connect and group a number of such electrodes in a battery, the details whereof form the subject of a separate application for patent thereon.

In the accompanying drawings, which form part of this specification, Figure 1 is a plan view cut away at its lower corner to show the interior portion and its exterior casing. Fig. 2 is an edgewise view of the same parts.

Referring to said drawings, in which like letters refer to similar parts, *a* represents the interior layers of soft carbonized fabric, which carry absorbed the material to be rendered active in the battery and which may be coated with a metallic oxid.

*b b* show the exterior incasing plates of highly-carbonized fabric.

*c* represents a metallic framing, and *d* shows a joining of the edges of the interior and exterior plates by means of a suitable cement.

Electrodes such as I have described when immersed in a proper electrolyte and electrically connected may be rapidly changed to a high voltage, and by reason of the enormous surface of the fabric composing them and carrying the active material may be made to yield a correspondingly-large amperage of current.

The carbonized plates both of the soft absorbent interior parts and of the hard exterior casing are practically indestructible by electrolytic action or by such chemical action as that to which they are subjected in use. Their component and their structure favors the absorption of and the evolving of gases, so that rapid charge may be made without disintegration and rapid discharge without detriment.

The foregoing, together with the extreme lightness of such electrodes as I have described, distinguishes my invention from all such as may be formed of pressed plates of coke or retort carbon or such as may have an interior or exterior structure of comminuted metal combined with carbon.

It is obvious that I might use perforated plates of carbonized cellulose or even of twisted cotton fibers carbonized without departing from my invention; but I prefer to use the form set forth as being the most advantageous.

Having described my invention, what I desire to secure by Letters Patent of the United States is—

An electrode for a reversible galvanic battery comprising an interior portion composed of layers of textile fabric carbonized, as an absorbent of a metallic salt in solution and carrier of a metallic oxid, to be made active in the battery; and an exterior portion consisting of plates composed of textile fabric carbonized, to form a casing for the electrode, substantially as shown and described and as and for the purposes set forth.

Signed this 11th day of September, 1902.

HERBERT COTTRELL.

Witnesses:
HOWARD H. ECKERT,
LOUIS A. SAYRE.